United States Patent
Wu et al.

(10) Patent No.: US 12,183,485 B2
(45) Date of Patent: Dec. 31, 2024

(54) METHOD AND SYSTEM FOR DETECTING TYPICAL OBJECT OF TRANSMISSION LINE BASED ON UNMANNED AERIAL VEHICLE (UAV) FEDERATED LEARNING

(71) Applicant: North China Electric Power University, Beijing (CN)

(72) Inventors: Xin Wu, Beijing (CN); Tanxin Pi, Beijing (CN); Yawen Yu, Beijing (CN)

(73) Assignee: North China Electric Power University, Beijing (CN)

( * ) Notice: Subject to any disclaimer, the term of this patent is extended or adjusted under 35 U.S.C. 154(b) by 268 days.

(21) Appl. No.: 17/987,203

(22) Filed: Nov. 15, 2022

(65) Prior Publication Data
US 2023/0238156 A1    Jul. 27, 2023

(30) Foreign Application Priority Data
Jan. 26, 2022  (CN) .......................... 202210092987.9

(51) Int. Cl.
*H01B 7/32* (2006.01)
*B64C 39/02* (2023.01)
(Continued)

(52) U.S. Cl.
CPC ............. *H01B 7/32* (2013.01); *B64C 39/024* (2013.01); *G06V 10/70* (2022.01); *B64U 2101/30* (2023.01); *G06V 2201/07* (2022.01)

(58) Field of Classification Search
CPC ........ H01B 7/32; B64C 39/024; G06V 10/70; G06V 2201/07; G06V 10/255;
(Continued)

(56) References Cited

U.S. PATENT DOCUMENTS 12,007,516 B2 * 6/2024 Dorrington ......... G06F 16/5854
2022/0128367 A1 * 4/2022 Uchida .............. G01C 21/3415
(Continued)

FOREIGN PATENT DOCUMENTS

CN       106170705   * 11/2016   ......... G01C 21/1654
CN       110634127   * 12/2019   ........... G06F 18/241
(Continued)

*Primary Examiner* — Jerome Grant, II
(74) *Attorney, Agent, or Firm* — Johnson | Dalal; Mark C. Johnson

(57) ABSTRACT

A method and system for detecting a typical object of a transmission line based on UAV federated learning. The method includes: determining a detection model for a typical object of a transmission line by YOLOv3 object detection algorithm according to a prior database for the typical object; dividing a UAV network into multiple federated learning units; acquiring pictures, taken by the UAV network, of the typical object and tags corresponding to each picture to determine a training database; training, based on Horovod framework and FATE federated learning framework, each federated learning unit according to the training database and the detection model for the typical object, and determining the trained UAV network according to the trained federated learning unit; and determining, by the trained UAV network, the typical object in each picture. A congestion of communication links is avoided, thereby improving detection efficiency.

6 Claims, 4 Drawing Sheets

(51) Int. Cl.
*G06V 10/70* (2022.01)
*B64U 101/30* (2023.01)

(58) Field of Classification Search
CPC ...... G06V 10/82; G06V 20/17; G06V 20/176; B64U 2101/30; G06N 20/00; G06F 18/214
USPC ........................................................ 382/159
See application file for complete search history.

(56) References Cited

U.S. PATENT DOCUMENTS

2022/0189029 A1* 6/2022 Mequanint .............. G06T 7/194
2024/0212311 A1* 6/2024 Arslan ................... G06V 10/82

FOREIGN PATENT DOCUMENTS

| CN | 110689531 | * | 1/2020 | ........... G06T 7/0008 |
| CN | 112732591 | * | 4/2021 | .......... G06F 12/0811 |
| CN | 113378918 | * | 9/2021 | ........... G06F 18/241 |

* cited by examiner

METHOD AND SYSTEM FOR DETECTING TYPICAL OBJECT OF TRANSMISSION LINE BASED ON UNMANNED AERIAL VEHICLE (UAV) FEDERATED LEARNING

CROSS REFERENCE TO RELATED APPLICATION

This patent application claims the benefit and priority of Chinese Patent Application No. 202210092987.9 filed on Jan. 26, 2022, which is incorporated by reference herein in its entirety as part of the present application.

TECHNICAL FIELD

The present disclosure relates to the field of object detection of a transmission line, and in particular to a method and system for detecting a typical object of a transmission line based on unmanned aerial vehicle (UAV) federated learning.

BACKGROUND ART

A typical object in a transmission line is an important guarantee for maintaining the normal operation of an overhead transmission line. For example, an electrical insulator can play a role of excellent insulation in a tower, a cross arm, and an electrical wire. However, the insulator exposed to the outdoors for a long time is vulnerable to sunlight, rain and chemical corrosion. On the other hand, the insulator is often affected by a strong electric field and an excessive mechanical load due to its special function and position in the whole overhead transmission line. As a result, the insulator is quite likely to be subject to cracking, damage, lightning flashover, and other faults. Once these faults occur, the transmission line cannot operate normally. Therefore, for stable operation of the overhead transmission line, it is extremely important to perform regular inspection and maintenance for the typical object of the transmission line, such as the electrical insulator.

Most conventional inspection methods adopt a manual inspection mode. However, manual inspection has disadvantages of large time consumption, high labor costs, big operational risks, and low efficiency. In recent years, with the rapid progress of computer vision technology and UAV technology, the manual inspection is replaced with UAV-based aerial photography and intelligent recognition and positioning algorithms, which has become one of mainstream development trends. The states of various transmission lines can be visually inspected by observing transmission line pictures taken by an UAV. For example, faults can be observed, such as, whether the wires are coated with ice and broken, whether pins are loose, and whether the insulator is subjected to cracking, and then operators are sent to remove the faults. However, the conventional training method for distributed models would have low detection efficiency, because a communication link is congested due to centralized data upload.

SUMMARY

The objective of the present disclosure is to provide a method and system for detecting a typical object of a transmission line based on UAV federated learning, which can avoid congestion of communication links and improve detection efficiency.

In order to achieve the above objective, the present disclosure provides the following technical solutions.

A method for detecting a typical object of a transmission line based on UAV federated learning includes:

determining a detection model for a typical object of a transmission line by using a you only look once, version 3 (YOLOv3) object detection algorithm according to a prior database for the typical object of the transmission line, where the prior database for the typical object of the transmission line includes a plurality of pictures of the typical object of the transmission line and a tag corresponding to each of the plurality of pictures, and the typical object of the transmission line includes an insulator, a wire, or a pin;

dividing a UAV network into multiple federated learning units, and acquiring the plurality of pictures, taken by the UAV network, of the typical object of the transmission line and the tag corresponding to each of the plurality of pictures to determine a training database;

training, based on a Horovod framework and a FATE federated learning framework, each federated learning unit according to the training database and the detection model for the typical object of the transmission line, and determining the trained UAV network according to the trained federated learning unit; and determining, by the trained UAV network, the typical object in each of the plurality of pictures of the typical object of the transmission line.

Optionally, training, based on the Horovod framework and the FATE federated learning framework, each federated learning unit according to the training database and the detection model for the typical object of the transmission line and determining the trained UAV network according to the trained federated learning unit specifically includes:

distributing, based on the Horovod framework, parallel computing power of each federated learning unit according to the training database and the detection model for the typical object of the transmission line to determine a weight of each federated learning unit;

aggregating, based on the FATE federated learning framework, the weights of all the federated learning units; and transferring the aggregated weights to each federated learning unit, and returning to the step of distributing, based on the Horovod framework, parallel computing power of each federated learning unit according to the training database and the detection model for the typical object of the transmission line to determine a weight of each federated learning unit, until a error function Loss converges; and determining the trained UAV network.

Optionally, the error function Loss is:

$$Loss = \lambda_{coord} L_1 + \lambda_{coord} L_2 + L_3 + L_4;$$

where, $L_1$ represents a center coordinate error; $L_2$ represents a width-height coordinate error; $L_3$ represents a confidence error; $L_4$ represents a classification error; and $\lambda_{coord}$ represents a joint error coefficient.

A system for detecting a typical object of a transmission line based on UAV federated learning includes:

a detection model determining module for a typical object of a transmission line configured to determine the detection model for the typical object of the transmission line by using a you only look once, version 3 (YOLOv3) object detection algorithm according to a prior database for the typical object of the transmission line, where the prior database for the typical object of the transmission line includes a plurality of pictures of the typical object of the transmission line and a tag corresponding to each of the plurality of pictures, and the typical object of the transmission line includes an insulator, a wire, or a pin;

a federated learning unit and training database determining module configured to divide a UAV network into multiple federated learning units and determine the training database by acquiring the plurality of pictures, taken by the UAV network, of the typical object of the transmission line and the tag corresponding to each of the plurality of pictures;

a trained UAV network determining module configured to train, based on a Horovod framework and a FATE federated learning framework, each federated learning unit according to the training database and the detection model for the typical object of the transmission line and determine the trained UAV network according to the trained federated learning unit; and a detecting module configured to determine, by the trained UAV network, the typical object in each of the plurality of pictures of the typical object of the transmission line.

Optionally, the trained UAV network determining module specifically includes:

a weight training unit for the federated learning unit configured to distribute, based on the Horovod framework, parallel computing power of each federated learning unit according to the training database and the detection model for the typical object of the transmission line to determine a weight of each federated learning unit;

a weight aggregating unit for the federated learning unit configured to aggregate, based on the FATE federated learning framework, the weights of all the federated learning units; and an iterating unit configured to transfer the aggregated weights to each federated learning unit and return to the weight training unit of the federated learning unit.

Optionally, a error function Loss is:

$$Loss = \lambda_{coord} L_1 + \lambda_{coord} L_2 + L_3 + L_4;$$

where, $L_1$ represents a center coordinate error; $L_2$ represents a width-height coordinate error; $L_3$ represents a confidence error; $L_4$ represents a classification error; and $\lambda_{coord}$ represents a joint error coefficient.

According to the specific embodiments provided by the present disclosure, the present disclosure discloses the following technical effects:

According to the method and system for detecting a typical object of a transmission line based on UAV federated learning of the present disclosure, the conventional manual inspection of the transmission line is replaced with a UAV inspection for taking pictures of the typical object, so that the shortcomings, such as low efficiency and large resource consumption of the manual inspection, can be effectively overcome. Compared with a conventional training method for a distributed model completed on a server unit formed by a simple connection, a UAV federated learning framework can efficiently update and feed back training parameters without performing centralized data upload, so as to avoid the congestion of the communication links and guarantee the privacy of data of all the federated learning units to the greatest extent.

BRIEF DESCRIPTION OF THE DRAWINGS

To describe the embodiments of the present disclosure or the technical solutions in the prior art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative effort.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

The objective of the present disclosure is to provide a method and system for detecting a typical object of a transmission line based on UAV federated learning, which can avoid congestion of communication links and improve detection efficiency.

To make the above-mentioned objective, features, and advantages of the present disclosure clearer and more comprehensible, the present disclosure will be further described in detail below in conjunction with the accompanying drawings and specific embodiments.

Figure 1:
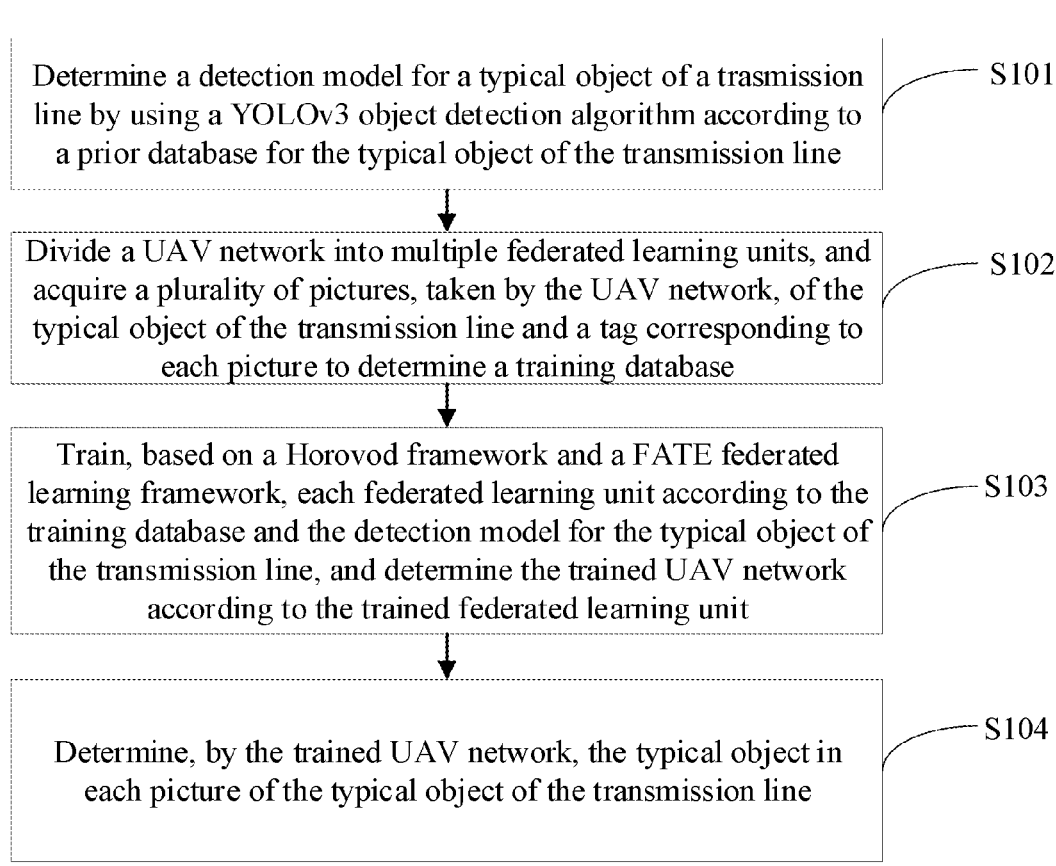
FIG. 1 is a flow chart of a method for detecting a typical object of a transmission line based on UAV federated learning according to the present disclosure.
Figure 2:
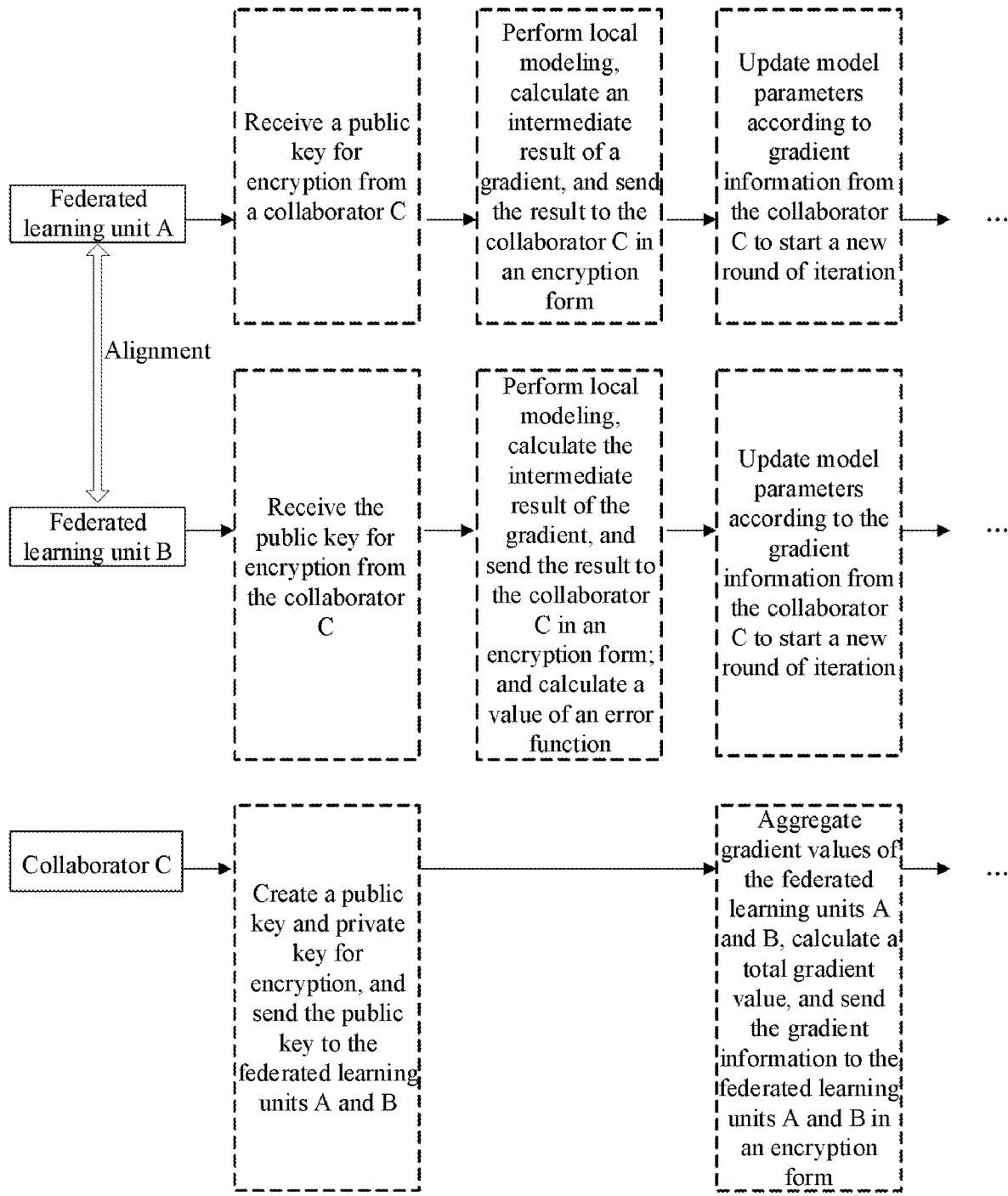
FIG. 2 is a flow chart of a process of UAV federated learning.

FIG. 1 shows a flow chart of the method for detecting a typical object of a transmission line based on UAV federated learning. As shown in FIG. 2, the method for detecting a typical object of a transmission line based on UAV federated learning includes the following steps.

In S101, a detection model for a typical object of a transmission line is determined by using a YOLOv3 object detection algorithm according to a prior database $I_0$ for the typical object of the transmission line, that is, a weight Po of the model is determined; where, the prior database for the typical object of the transmission line includes a plurality of pictures of the typical object of the transmission line and tags corresponding to the plurality of pictures, and the typical object of the transmission line includes an insulator, a wire, or a pin.

In S102, a UAV network is divided into multiple federated learning units, and the plurality of pictures, taken by the UAV network, of the typical object of the transmission line and the tags corresponding to the plurality of pictures are acquired to determine a training database.

The UAV network containing N UAV nodes is divided into/federated learning units, each of which consists of $a_i$ UAVs.

Parameters $a_i$, N, and l satisfy the following formula:

$$N = \sum_{i=1}^{l} a_i;$$

where, $a_i$ represents the number of the UAV nodes in the $i^{th}$ federated learning unit.

The number M of the pictures taken by the UAV satisfies the following formula:

$$L = \sum_{j=1}^{M}\sum_{k=1}^{b_j} Tag_{jk};$$

where, L represents a total number of training tags marked in the M pictures; $b_j$ represents the number of the training tags in the $j^{th}$ picture; and $Tag_{jk}$ represents the $k^{th}$ training tag in the $j^{th}$ picture.

In S103, each federated learning unit is trained based on a Horovod framework and a FATE federated learning framework according to the training database and the detection model for the typical object of the transmission line, and the trained UAV network is determined according to the trained federated learning unit.

S103 specifically includes the following steps:

Parallel computing power of each federated learning unit is distributed based on the Horovod framework according to the training database and the detection model for the typical object of the transmission line to determine a weight of each federated learning unit;

The weights of all the federated learning units are aggregated based on the FATE federated learning framework; and The aggregated weights are transferred to each federated learning unit, and the step that parallel computing power of each federated learning unit is distributed based on the Horovod framework according to the training database and the detection model for the typical object of the transmission line to determine a weight of each federated learning unit, is returned until a error function Loss converges, such that the trained UAV network is determined.

The error function Loss is:

$$Loss = \lambda_{coord} L_1 + \lambda_{coord} L_2 + L_3 + L_4;$$

Where, $L_1$ represents a center coordinate error; $L_2$ represents a width-height coordinate error; $L_3$ represents a confidence error; $L_4$ represents a classification error; and $\lambda_{coord}$ represents a joint error coefficient.

Figure 3:
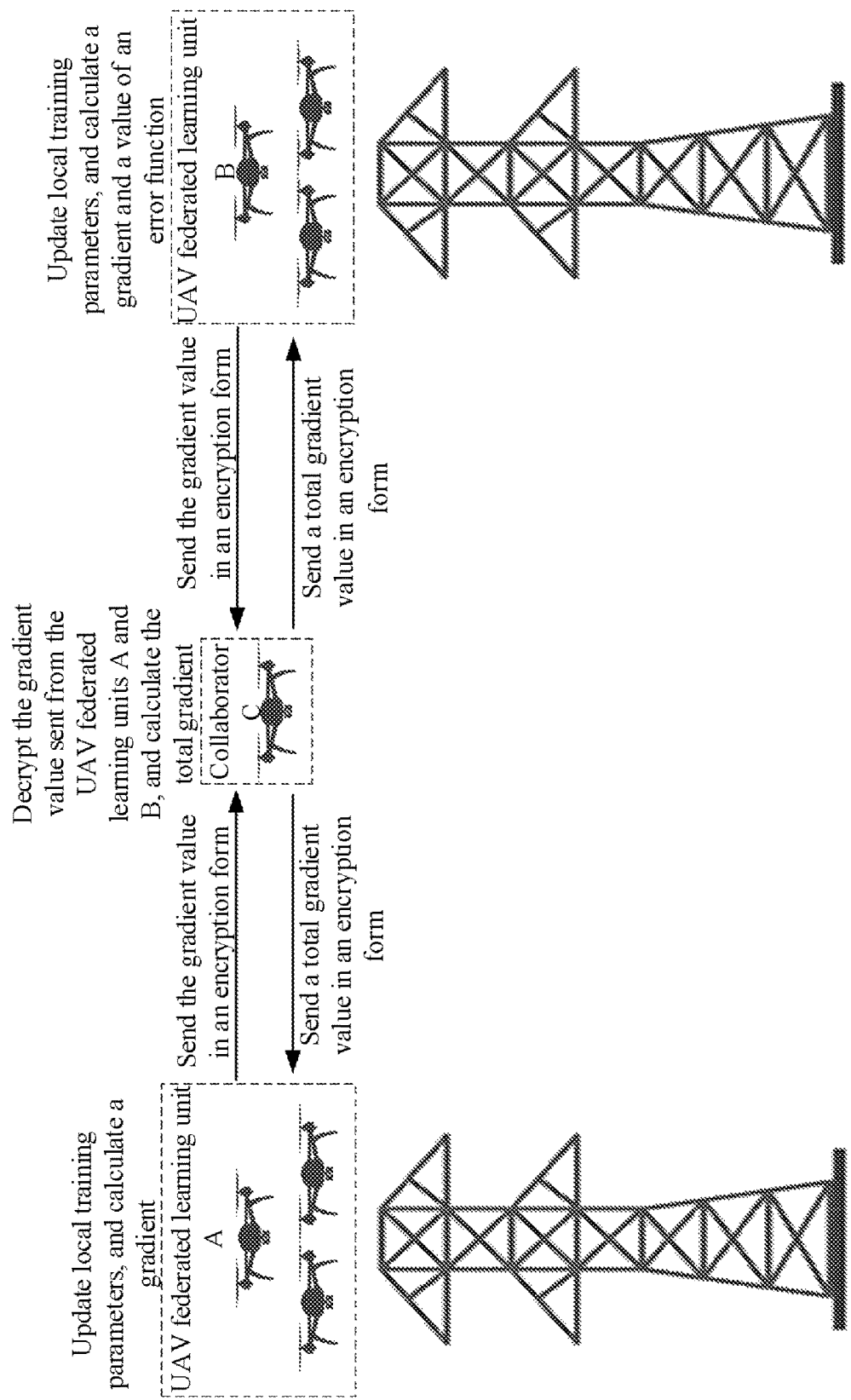
FIG. 3 is a schematic diagram of the process of the UAV federated learning.

As shown in FIGS. 2 and 3, Horovod is a distributed training framework adopting a Ring-Allreduce algorithm. The basic process of performing distributed training by using the Ring-Allreduce algorithm includes the following steps:

S1: a gradient of each UAV is calculated according to training data of the UAV;

S2: a gradient vector of each UAV is sliced into H segments which are approximately equal in length (where the number of the segments H is the same as the number of the UAVs);

S3: H−1 rounds of gradient transmission and gradient addition are performed such that a small part of the gradient vector of each UAV is a sum of the segmented gradients of all the UAVs;

S4: the sum, calculated in S3, of the segmented gradients of each gradient vector is broadcast to other UAVs through the H−1 rounds of gradient transmission; and S5: the segmented gradients are merged on each UAV, and a model on the UAV is updated according to the gradients.

Assuming that a total number of parameters of the training model is set as X, the number of a Parameter Server unit in the model is 1, and the number of a Worker unit in the model is H.

Based on this, the number of times E of information transmission required for each UAV in the Horovod framework is:

$$E = 2N-1;$$

The time T for completing batch interaction data transmission every time by the training model is:

$$T = \frac{2X(N-1)}{NB};$$

As N increases gradually, the T approaches T', and T' satisfies the following formula:

$$T' = \frac{2X}{N};$$

All modules in the FATE federated learning framework have the following functions:

FATE Flow includes a Client part and a Server part, where the Client part is used by a user to submit a federated learning task to a FATE cluster. A FATE Flow Server serves as an access for the FATE cluster to provide external services.

MySQL is used to store some metadata related to the federated learning task, such as creation time and a state.

EGG/ROLL provides distributed computing and storage capabilities for a training task.

Meta Service is a set of data or a file, which can be sliced and distributed on different Eggs. Meta Service is responsible for managing and locating slicing information of the file.

Federation provides a function of transmitting and receiving data for the training task. Due to a special nature of federated learning, all participants exchange data for several times during training.

Proxy provides a reverse proxy service, and serves as the only access of the FATE cluster to the outside (to train other participants).

FATE Board provides visualization of the training task for the user.

FATE Serving provides an online reasoning service. The user can push the trained model to this service for online reasoning.

A process for executing the federated learning by a UAV federated learning unit A and a UAV federated learning unit B under the coordination of a collaborator C is taken as an example below to illustrate a process of Federated learning.

In Step S1, shared picture data of the UAV federated learning units A and B is confirmed based on an encrypted user sample alignment technology on the premise that the UAV federated learning units A and B do not disclose their respective data, so as to combine the characteristics of these picture data for modeling;

In step S2, the collaborator C distributes a public key to the UAV federated learning units A and B to encrypt data exchanged during training;

In step S3, the UAV federated learning units A and B respectively calculate an intermediate result of the gradient, and then send the result to the collaborator C in an encryption form; and the UAV federated learning unit B calculates a value of a loss function according to its tag data;

In step S4, the collaborator C decrypts the results sent from the UAV federated learning units A and B, and calculates a total gradient value by aggregation, and then sends the total gradient value to the UAV federated learning units A and B in an encryption form; and In step S5, the UAV federated learning units A and B update parameters of their respective models according to the gradient, and start a new round of training.

Figure 4:
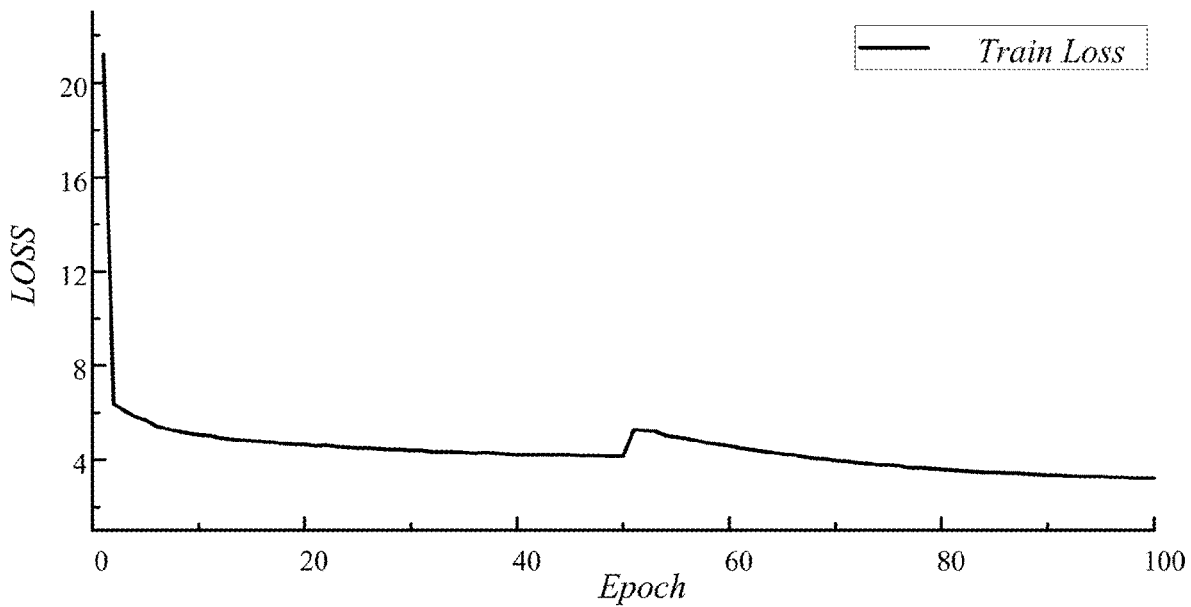
FIG. 4 is a curve chart of a Loss error function in the process of the UAV federated learning.

FIG. 4 shows a convergence process of a value of the error function Loss in 1-100 rounds of iterative training of the model, and an analytical formula of the error function Loss is:

$$Loss = \lambda_{coord}L_1 + \lambda_{coord}L_2 + L_3 + L_4$$

Where, $L_1$ represents a center coordinate error; $L_2$ represents a width-height coordinate error; $L_3$ represents a confidence error; and $L_4$ represents a classification error.

The center coordinate error $L_1$ satisfies the following formula:

$$L_1 = \sum_{p=0}^{S^2}\sum_{q=0}^{B} F_{pq}^{obj}\left[(x_p^q - \hat{x}_p^q)^2 + (y_p^q - \hat{y}_p^q)^2\right];$$

Where, $S^2$ represents the number of grids, namely $S*S$; $B$ represents the number of candidate frames; $F_{pq}^{obj}$ represents a state that the $j^{th}$ candidate frame of the $p^{th}$ grid is responsible for a project; $x_p^q$ and $\hat{x}_p^q$ respectively represent a predicted value and an actual value of an abscissa of a center point of the $j^{th}$ candidate frame of the $p^{th}$ grid; and $y_p^q$ and $\hat{y}_p^q$ respectively represents a predicted value and an actual value of an ordinate of the center point of the $j^{th}$ candidate frame of the $p^{th}$ grid.

The width-height coordinate error $L_2$ satisfies the following formula:

$$L_2 = \sum_{p=0}^{S^2}\sum_{q=0}^{B} F_{pq}^{obj}\left[(w_p^q - \hat{w}_p^q)^2 + (h_p^q - \hat{h}_p^q)^2\right];$$

Where, $w_p^q$ and $\hat{w}_p^q$ respectively represent a predicted value and an actual value of a width of the $j^{th}$ candidate frame of the $p^{th}$ grid; and $h_p^q$ and $\hat{h}_p^q$ respectively represent a predicted value and an actual value of a height of the $j^{th}$ candidate frame of the $p^{th}$ grid.

The confidence error $L_3$ satisfies the following formula:

$$L_3 = -\sum_{p=0}^{S^2}\sum_{q=0}^{B} F_{pq}^{obj}\left[\hat{C}_p^q \log C_p^q + (1 - \hat{C}_p^q)\log(1 - \hat{C}_p^q)\right] -$$

$$\lambda_{noobj}\sum_{p=0}^{S^2}\sum_{q=0}^{B} F_{pq}^{noobj}\left[\hat{C}_p^q \log C_p^q + (1 - \hat{C}_p^q)\log(1 - \hat{C}_p^q)\right];$$

Where, $F_{pq}^{noobj}$ represents a state that the $j^{th}$ candidate frame of the $p^{th}$ grid is not responsible for the project; and $C_p^q$ and $\hat{C}_p^q$ respectively represent a predicted value and an actual value of confidence of the $j^{th}$ candidate frame of the $p^{th}$ grid.

The classification error $L_4$ satisfies the following formula:

$$L_4 = -\sum_{p=0}^{S^2} F_{pq}^{obj} \sum_{c \in classes}\left[\hat{P}_p^q \log P_p^q + (1 - \hat{P}_p^q)\log(1 - P_p^q)\right];$$

Where, $P_p^q$ and $\hat{P}_p^q$ respectively represent a predicted value and an actual value of a classification probability of the $j^{th}$ candidate frame of the $p^{th}$ grid.

In S104, the typical object in each picture of the typical object of the transmission line is determined by the trained UAV network.

Figure 5:
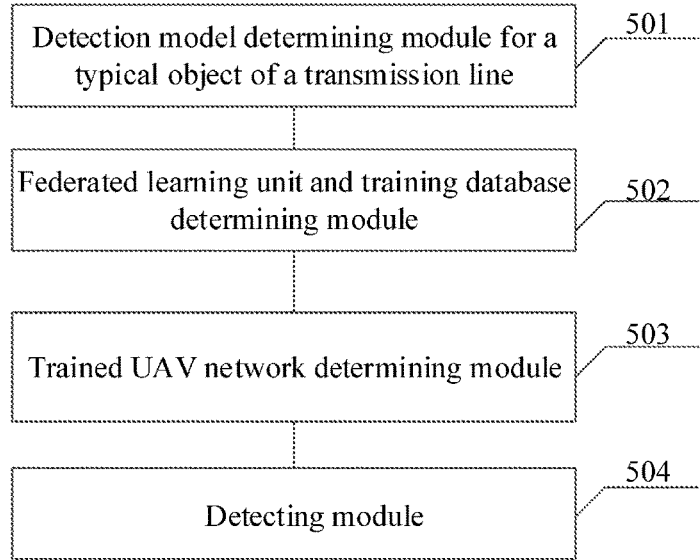
FIG. 5 is a structure diagram of a system for detecting a typical object of a transmission line based on UAV federated learning according to the present disclosure.

FIG. 5 shows a structure diagram of the system for detecting a typical object of a transmission line based on UAV federated learning. As shown in FIG. 5, the system for detecting the typical object of the transmission line based on UAV federated learning includes:

A detection model determining module 501 for the typical object of the transmission line, configured to determine the detection model for the typical object of the transmission line by using a YOLOv3 object detection algorithm according to a prior database for the typical object of the transmission line, where the prior database for the typical object of the transmission line includes a plurality of pictures of the typical object of the transmission line and a tag corresponding to each picture, and the typical object of the transmission line includes an insulator, a wire, or a pin;

A federated learning unit and training database determining module 502 configured to divide a UAV network into multiple federated learning units and determine the training database by acquiring the plurality of pictures, taken by the UAV network, of the typical object of the transmission line and the tag corresponding to each picture;

A trained UAV network determining module 503 configured to train, based on a Horovod framework and a FATE federated learning framework, each federated learning unit according to the training database and the detection model for the typical object of the transmission line and determine the trained UAV network according to the trained federated learning unit; and A detecting module 504 configured to determine, by the trained UAV network, the typical object in each picture of the typical object of the transmission line.

The trained UAV network determining module 503 specifically includes:

A weight training unit for the federated learning unit configured to distribute, based on the Horovod framework, parallel computing power of each federated learning unit according to the training database and the detection model for the typical object of the transmission line to determine a weight of the federated learning unit;

A weight aggregating unit for the federated learning unit configured to aggregate, based on the FATE federated learning framework, the weights of all the federated learning units; and An iterating unit configured to transfer the aggregated weights to each federated learning unit and return to the weight training unit for the federated learning unit.

A error function Loss is:

$$Loss = \lambda_{coord}L_1 + \lambda_{coord}L_2 + L_3 + L_4;$$

Where, $L_1$ represents a center coordinate error; $L_2$ represents a width-height coordinate error; $L_3$ represents a confidence error; $L_4$ represents a classification error; and $\lambda_{coord}$ represents a joint error coefficient.

The embodiments of the present specification are described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and implementations of the present disclosure. The foregoing description of the embodiments is merely intended to help understand the method of the present disclosure and its core ideas; besides, various modifications may be made by a person of ordinary skill in the art to specific implementations and the scope of application in accordance with the ideas of the present disclosure. In conclusion, the content of the present specification shall not be construed as limitations to the present disclosure.

What is claimed is:

1. A method for detecting a typical object of a transmission line based on unmanned aerial vehicle (UAV) federated learning, comprising:
    determining a detection model for a typical object of a transmission line by using a you only look once, version 3 (YOLOv3) object detection algorithm according to a prior database for the typical object of the transmission line, wherein the prior database for the typical object of the transmission line comprises a plurality of pictures of the typical object of the transmission line and a tag corresponding to each of the plurality of pictures, and the typical object of the transmission line comprises an insulator, a wire, or a pin;
    dividing a UAV network into multiple federated learning units, and acquiring the plurality of pictures, taken by the UAV network, of the typical object of the transmission line and the tag corresponding to each of the plurality of pictures to determine a training database;
    training, based on a Horovod framework and a FATE federated learning framework, each federated learning unit according to the training database and the detection model for the typical object of the transmission line, and determining the trained UAV network according to the trained federated learning unit; and
    determining, by the trained UAV network, the typical object in each of the plurality of pictures of the typical object of the transmission line.

2. The method for detecting the typical object of the transmission line based on UAV federated learning according to claim 1, wherein training, based on the Horovod framework and the FATE federated learning framework, each federated learning unit according to the training database and the detection model for the typical object of the transmission line and determining the trained UAV network according to the trained federated learning unit specifically comprises:
    distributing, based on the Horovod framework, parallel computing power of each federated learning unit according to the training database and the detection model for the typical object of the transmission line to determine a weight of each federated learning unit;
    aggregating, based on the FATE federated learning framework, the weights of all the federated learning units; and
    transferring the aggregated weights to each federated learning unit, and returning to the step of distributing, based on the Horovod framework, parallel computing power of each federated learning unit according to the training database and the detection model for the typical object of the transmission line to determine a weight of each federated learning unit until a Loss error function converges; and determining the trained UAV network.

3. The method for detecting the typical object of the transmission line based on UAV federated learning according to claim 2, wherein the error function Loss is:

$$\text{Loss} = \lambda_{coord} L_1 + \lambda_{coord} L_2 + L_3 + L_4;$$

wherein, $L_1$ represents a center coordinate error; $L_2$ represents a width-height coordinate error; $L_3$ represents a confidence error; $L_4$ represents a classification error; and $\lambda_{coord}$ represents a joint error coefficient.

4. A system for detecting a typical object of a transmission line based on UAV federated learning, comprising:
    a detection model determining module for a typical object of a transmission line, configured to determine the detection model for the typical object of the transmission line by using a you only look once, version 3 (YOLOv3) object detection algorithm according to a prior database for the typical object of the transmission line, wherein the prior database for the typical object of the transmission line comprises a plurality of pictures of the typical object of the transmission line and a tag corresponding to each of the plurality of pictures, and the typical object of the transmission line comprises an insulator, a wire, or a pin;
    a federated learning unit and training database determining module, configured to divide a UAV network into multiple federated learning units and determine the training database by acquiring the plurality of pictures, taken by the UAV network, of the typical object of the transmission line and the tag corresponding to each of the plurality of pictures;
    a trained UAV network determining module, configured to train, based on a Horovod framework and a FATE federated learning framework, each federated learning unit according to the training database and the detection model for the typical object of the transmission line, and determine the trained UAV network according to the trained federated learning units; and
    a detecting module, configured to determine, by the trained UAV network, the typical object in each of the plurality of pictures of the typical object of the transmission line.

5. The system for detecting the typical object of the transmission line based on UAV federated learning according to claim 4, wherein the trained UAV network determining module specifically comprises:
    a weight training unit for the federated learning unit, configured to distribute, based on the Horovod framework, parallel computing power of each federated learning unit according to the training database and the detection model for the typical object of the transmission line to determine a weight of each federated learning unit;
    a weight aggregating unit for the federated learning unit, configured to aggregate, based on the FATE federated learning framework, the weights of all the federated learning units; and
    an iterating unit, configured to transfer the aggregated weights to each federated learning unit and return to the weight training unit of the federated learning unit.

6. The system for detecting the typical object of the transmission line based on UAV federated learning according to claim 5, wherein a error function Loss is:

$$Loss = \Delta_{coord} L_1 + \lambda_{coord} L_2 + L_3 + L_4;$$

wherein, $L_1$ represents a center coordinate error; $L_2$ represents a width-height coordinate error; $L_3$ represents a confidence error; $L_4$ represents a classification error; and $\lambda_{coord}$ represents a joint error coefficient.

* * * * *